United States Patent
Krakowski et al.

(10) Patent No.: US 12,074,734 B2
(45) Date of Patent: Aug. 27, 2024

(54) METHOD OF CHANNEL ESTIMATION IN A COMMUNICATION SYSTEM AS WELL AS SIGNAL PROCESSING SYSTEM

(71) Applicant: Rohde & Schwarz GmbH & Co. KG, Munich (DE)

(72) Inventors: Claudiu Krakowski, Munich (DE); Niels Petrovic, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 93 days.

(21) Appl. No.: 17/675,368

(22) Filed: Feb. 18, 2022

(65) Prior Publication Data

US 2022/0321384 A1 Oct. 6, 2022

(30) Foreign Application Priority Data

Mar. 31, 2021 (EP) ..................................... 21166453

(51) Int. Cl.
*H04L 25/02* (2006.01)
*H04L 25/03* (2006.01)

(52) U.S. Cl.
CPC ........ *H04L 25/025* (2013.01); *H04L 25/0224* (2013.01); *H04L 25/03891* (2013.01)

(58) Field of Classification Search
CPC .............. H04L 25/025; H04L 25/0224; H04L 25/03891
See application file for complete search history.

(56) References Cited

U.S. PATENT DOCUMENTS

| 11,146,422 B1* | 10/2021 | Kalogiros | ............. H04L 25/022 |
| 2005/0052989 A1* | 3/2005 | Tao | ...................... H04L 25/0232 370/203 |

(Continued)

FOREIGN PATENT DOCUMENTS

| CN | 106533590 A | 3/2017 |
| CN | 111010256 A | 4/2020 |
| KR | 20070091755 A | 9/2007 |

OTHER PUBLICATIONS

Higashinaka, M. et al., "Channel Estimation with Interference Cancellation for a MIMO Receiver Using Iterative Equalization and Decoding," Personal, Indoor and Mobile Radio Communications, 2008, IEEE, 19th International Symposium, New Jersey, USA.

(Continued)

*Primary Examiner* — Natasha W Cosme
(74) *Attorney, Agent, or Firm* — CHRISTENSEN O'CONNOR JOHNSON KINDNESS PLLC

(57) ABSTRACT

A method of channel estimation in a communication system includes the steps of: receiving at least one input signal associated with at least one data stream, the input signal having reference symbols and data symbols; processing the at least one input signal in a slot-wise manner; performing a channel estimation by taking at least one reference symbol per input signal into account, which is used to equalize the respective input signal and to assign the symbols to the at least one data stream, thereby generating a processed signal for each independent data stream, and processing further the processed signal while performing an additional channel estimation for each independent data stream, wherein the reference symbols and the data symbols are taken into account for the additional channel estimation. Further, a signal processing system is described.

16 Claims, 1 Drawing Sheet

(56) References Cited

U.S. PATENT DOCUMENTS

2015/0124911 A1  5/2015 Wicker, Jr. et al.
2020/0052933 A1* 2/2020 Lee ................... H04L 25/03057

OTHER PUBLICATIONS

Kim, H-M. et al., "Frequency Domain Channel Estimation for MIMO SC-FDMA Systems with CDM Pilots," Journal of Communications and Networks; 16:4, Aug. 2014, pp. 447-457.

* cited by examiner

METHOD OF CHANNEL ESTIMATION IN A COMMUNICATION SYSTEM AS WELL AS SIGNAL PROCESSING SYSTEM

FIELD OF THE DISCLOSURE

Embodiments of the present disclosure generally relate to a method of channel estimation in a communication system. Further, embodiments of the present disclosure relate to a signal processing system for channel estimation.

BACKGROUND

In the state of the art, particularly with respect to communication standards like Long Term Evolution (LTE), methods and systems have been implemented that are used for calculating an error vector magnitude (EVM) for a single data stream, also called single layer, particularly a single uplink (UL) data stream, namely single layer UL.

In 5G or rather 5G-New Radio (5G-NR), the respective error vector magnitude requirement for a single data stream is based on established practice that was used in the Long Term Evolution (LTE) communication. However, the respective requirement for two or more data streams, namely two-layer uplink (2-layer UL), is however not adequately defined so far.

Accordingly, there is need for a method of error vector magnitude calculation that can be used for a multi-layer transmission as well as single layer transmission with transmission and/or receiving diversity.

SUMMARY

Embodiments of the present disclosure provide a method of channel estimation in a communication system. In an embodiment, the method comprises the steps of: receiving at least one input signal associated with at least one data stream (layer), the input signal having reference symbols and data symbols; processing the at least one input signal in a slot-wise manner; performing a channel estimation by taking at least one reference symbol per input signal into account, which is used to equalize the respective input signal and to assign the symbols to the at least one data stream, thereby generating a processed signal for each independent data stream, and processing further the processed signal while performing an additional channel estimation for each independent data stream, wherein the reference symbols and the data symbols are taken into account for the additional channel estimation.

Further, embodiments of the present disclosure provide a signal processing system for channel estimation. In an embodiment, the signal processing system comprises at least one input port and a processing circuit connected with the input port. The at least one input port is configured to receive at least one input signal associated with at least one data stream, the input signal having reference symbols and data symbols. The processing circuit is configured to process the input signal received via the input port in a slot-wise manner. The processing circuit is further configured to: perform a channel estimation by taking at least one reference symbol per input channel into account, which is used to equalize the respective input signal and to assign the symbols to the at least one data stream, thereby generating a processed signal for independent data stream, and process further the processed signal while performing an additional channel estimation for independent data stream, wherein the reference symbols and the data symbols are taken into account for the additional channel estimation.

The present disclosure is based on the finding that the channel estimation in the communication system can be done in a simple and efficient manner by using a two-step approach. In the first step of the two-step approach, only at least one reference symbol is taken into account per time slot such that the processed signal per independent data stream is obtained that can be used for further processing in order to perform the additional channel estimation in a second step for each data stream individually. In the second step of the two-step approach, the additional channel estimation is done based on the reference symbols and the data symbols per time slot while also taking the processed signal per data stream into account. The additional channel estimation is also done for each data stream individually and independently.

Accordingly, a processed signal is obtained for each data stream individually, wherein each of the processed signals obtained is processed further individually and independently of the other processed signals. In the second step, each of the processed signals is independently processed further in order to perform the additional channel estimation for each data stream individually.

In case of receiving multiple data streams, a data stream separation may be performed. The data stream separation is done, for example, by a multiple input multiple output (MIMO) equalization technique.

The slot-wise processing of the input signal corresponds to portioning the input signal into several pieces, comprising one time slot each. The respective time slots obtained are each processed separately. Each of the time slots comprise reference symbols and data symbols such that the channel estimation, e.g. the two-step approach described above, can be applied to all time slots.

In general, the channel estimation can be done for input signals having a minimized number of symbols per time slot, as a single reference symbol is already sufficient, for instance the first one within the respective time slot. Generally, the reference symbol may be associated with to a demodulation reference signal (DMRS). However, it is not necessary to use all symbols of the respective demodulation reference signal for performing the channel estimation, as it is sufficient to use only one reference symbol, for instance the first one. This ensures that comparable error vector magnitude results can be obtained that are independent of the number of reference symbols per time slot.

In the channel estimation performed, which takes only the at least one reference symbol per input signal into account, the associated input signal is equalized, namely all symbols associated with the input signal are equalized, thereby ensuring that the data symbols received can be assigned to the respective data streams, namely the layers, in case of a multi-layer transmission.

Accordingly, the channel estimation is performed by taking at least one reference symbol per input signal into account, wherein the respective input signal is equalized such that all symbols associated with the input signal are equalized. Hence, all symbols are assigned to the at least one data stream. While doing this, the processed signal(s) for each independent data stream is/are generated.

The processed signal(s) generated is/are further processed, thereby performing the additional channel estimation for each independent data stream. In other words, the processed signal(s) generated is/are further processed in order to perform the additional channel estimation for each independent data stream.

In addition, a decision decoding may take place, wherein a decision is made for the nearest constellation point, thereby obtaining nominal data symbols associated with the respective data streams. Thus, the nominal data symbols are created by a demodulation process. The location to gain the demodulated data symbols is the error vector magnitude.

Accordingly, measured data and reference symbols as well as the nominal data symbols are provided, for example for each data stream individually. The respective symbols, namely the measured data and reference symbols as well as the nominal data symbols, can be used for determining the EVM.

In some embodiments, all reference symbols and all data symbols are taken into account for the additional channel estimation.

Two input signals may be received, for instance by two ports, two antennas or rather two differently polarized antenna elements, e.g. a horizontally polarized antenna element as well as a vertically polarized antenna element.

An aspect provides that the channel estimation and/or the additional channel estimation are/is performed, for example, without using reconstructed data symbols. As mentioned above, the respective data symbols may be obtained in a post-processing step that takes place after the channel estimation. However, the result of this post-processing is not used for performing the (additional) channel estimation. For instance, the additional channel estimation, which is performed for each independent data stream independently, is based on the reference symbols and the data symbols as well as the processed signal obtained when performing the channel estimation. In other words, the additional channel estimation is independent of the reconstructed/demodulated data symbols, namely the transmitted data symbols.

Another aspect provides that the channel estimation is performed, for example, by only taking the at least one reference symbol per input signal into account. For instance, only one reference symbol per input signal is taken into account, namely the first one. Thus, an efficient and comparable channel estimation is done in the first step of the two-step approach, as the number of reference symbols per input signal received has no influence on the channel estimation.

In a certain embodiment, at least two input signals are received that correspond to a single data stream. Hence, a receiving diversity (RX diversity) is provided, as this receiver has at least two different ports for receiving the two input signals. The two input signals may correspond to a single data stream such that the receiving diversity is provided.

In general, a maximum ratio combining may be performed that is based only on reference signals, e.g. the demodulation reference signals (DMRS), without including any data symbols. In some embodiments, one or all DMRS symbols of one time slot can be considered for the maximum ratio combining. The output of the maximum ratio combining corresponds to a combined signal that is processed by using a single layer procedure.

Further, at least two input signals may be received that correspond to two independent data streams. Thus, a multi-layer transmission is provided, namely a multi data stream transmission. Hence, the method relates to a method of error vector magnitude (EVM) calculation for uplink multiple input multiple output (MIMO). For instance, two input signals and two independent data streams, namely two layers, may be provided, resulting in a 2×2 communication system. However, the same procedure may also be applicable for transmission with four data streams, namely four layers, that are received on four receiving ports, resulting in four input signals.

In some embodiments, the number of input signals received correspond to the number of receiving ports involved in the respective method.

In some embodiments, the number of input signals is higher or equal the number of independent data streams. Hence, at last two different input signals may be received, for example, that are associated with at least one data stream.

Another aspect provides that a least squares method is, for example, used when performing the channel estimation and/or the additional channel estimation. The least squares method is known for a single data stream. Since the data streams have been separated previously or rather combined in case of receiving diversity, a single data stream is provided such that the least squares method can be applied by taking the measured data symbols and reference symbols as well as the nominal data symbols into account.

A channel equalization may be performed based on the additional channel estimation. The least squares method may be used to determine equalizer coefficients. The respective equalizer coefficients are used to equalize the respective data symbols of the input signal, which can be used for channel equalization. Accordingly, the equalization may be done during the further processing, wherein the respective equalization is done for each data stream individually.

For instance, the channel equalization is done by a zero forcing equalizer. The zero forcing equalizer provides a diagonalization of the respective channel to be equalized such that error vector magnitude calculation can be simplified appropriately, as noise accompanying the signal in each data stream can be determined and quantified easily.

In addition, equalization coefficients may be determined. The equalization coefficients are determined by the least squares method that is done in the channel estimation step as described above. The respective equalization coefficients are used to equalize the respective data symbols.

The equalization coefficients determined may be used for equalizing the symbols at different points in time. Thus, it is not necessary to determine equalization coefficients for the different points in time, as the same equalization coefficient can be used.

Another aspect provides that the channel estimation is performed for a subset of orthogonal frequency-division multiplexing (OFDM) subcarriers, wherein an interpolation is performed. Hence, the channel estimation in the first step of the two-step approach is not performed for all subcarriers and, thus, an interpolation is required. In some embodiments, the channel estimation is only done for those subcarriers associated with reference symbols. However, the reference symbols are only transmitted on subcarriers of one Code Division Multiplex (CDA) group, the channel interpolation is done in order to obtain channel coefficients for all subcarriers.

The channel estimation may be performed for several orthogonal frequency-division multiplexing (OFDM) subcarriers, wherein the channel estimation comprises a smoothing step. Hence, the channel estimation done in the first step of the first two-step approach is smoothed over several subcarriers in the frequency domain. The smoothing step may be done prior or after the interpolation mentioned before.

Another aspect provides that an error vector magnitude, for example, is calculated. The error vector magnitude can be calculated in a communication system, for instance a mobile communication system. The respective error vector magnitude may be calculated by a radio measurement device that comprises the signal processing system.

In some embodiments, the nominal data symbols obtained for each data stream individually as well as the equalized data symbols obtained for each data stream individually are used for calculating the error vector magnitude for each data stream individually.

Generally, the communication system may relate, for example, to a MIMO system or rather any diversity communication system, e.g. a communication system with receiving diversity.

In addition, the subcarriers may be obtained by the orthogonal frequency-division multiplexing (OFDM) technique or other techniques, e.g. single carrier—frequency division multiple access (SC-FDMA) technique.

In a diversity communication system, e.g. a communication system with receiving diversity, two input signals are received at two different ports, wherein the two input signals are associated with the same data stream, e.g. layer. Hence, a 1-layer communication system with receiving diversity is provided.

Generally, the two signals may be received at two different ports for Frequency Range 1 (FR1) or rather at two polarized receive antennas, namely vertically (V) and horizontally (H) polarized antennas, for Frequency Range 2 (FR2). FR1 and FR2 relate to frequency bands of the 5G-NR communication standard.

As mentioned above, the processing requires an additional step for combining the signals received compared to a single layer transmission without any diversity. Once the input signals have been combined, a combined signal is obtained that is processed by using single layer procedure without receive diversity.

For the EVM calculation, a single time slot comprising up to 14 symbols, e.g. OFDM symbols, including reference symbols and data symbols is taken into account. Hence, the input signals are processed in a slot-wise manner.

The channel estimation for maximum ratio combining is based only on reference signals (DMRS) without including any data symbols. One or all DMRS symbols of one time slot can be considered, but in order to obtain comparable EVM results independent of the number of reference symbols per slot, only the first reference symbol is used.

In the communication system defined, an estimation of an effective 2×1 channel is required. In case of transmit diversity, the effective channel includes the precoding matrix P such that $$\tilde{H} = HP = \begin{bmatrix} \tilde{h}_0 \\ \tilde{h}_1 \end{bmatrix}$$

with $$\tilde{h}_n = \frac{y_n r^*}{|r|^2}$$

where y denotes the received symbol on port index n and r the reference signal.

Since reference signals are transmitted only on subcarriers of one Code Division Multiplex (CDM) group, a channel interpolation is done in order to obtain channel coefficients for all subcarriers taken into account. The channel interpolation is done by using the channel coefficients of the active CDM group in all other CDM groups.

The channel coefficients used to calculate the equalizer coefficients are obtained after a channel smoothing in frequency domain by computing the moving average of interpolated channel coefficients. However, the channel smoothing may also be done afterwards. Irrespective thereof, the moving average window size is seven due to the fourteen symbols within one time slot. For subcarriers at or near the edge of allocation the window size can be reduced accordingly.

The equalizer coefficients, e.g. zero forcing equalizer coefficients, for the maximum ratio combining are calculated as a pseudo inverse of the effective channel, namely as follows:

$$G_{ZF} = \tilde{H}^+ = (\tilde{H}^H \tilde{H})^{-1} \tilde{H}^H$$

As mentioned above, the combined signal is processed using the single layer procedure.

Since the channel estimation for the maximum ratio combining is calculated only on the first reference symbol, an averaging including all 14 symbols of one slot, i.e. data and reference signals, is suitable in order to minimize the EVM. This averaging is achieved by the least squares method known from single layer processing, e.g. a post FFT equalization.

Accordingly, measured data symbols and reference symbols and nominal data symbols are processed by a least square (LS) estimator, thereby deriving one equalizer coefficient per time slot and per allocated subcarrier, namely EC(f), which is defined as $$EC(f) = \frac{\Sigma_{t=0}^{13} NS(f, t)^* NS(f, t)}{\Sigma_{t=0}^{13} MS(f, t)^* NS(f, t)}$$

with * denoting complex conjugation.

EC(f) are used to equalize the data symbols. Different to the single layer procedure without receiving diversity, the equalizer coefficients EC (f) are not used to calculate EVM equalizer spectral flatness which is derived from the equalizer for the maximum ratio combining.

Afterwards, the nominal data symbols and the equalized data symbols can be processed in order to calculate the EVM in the single data stream communication system having receiving diversity.

In a communication system with multi data stream transmission, at least two different input signals are also received similar to the single data stream communication system with receiving diversity.

Compared to a single data stream transmission, an additional step for MIMO equalization is introduced to separate the at least two data streams. Once the at least two data streams are separated each data stream is processed using already defined single data stream procedure mentioned above.

The MIMO equalization is also based on a channel estimation based on reference symbols. In some embodiments, each MIMO communication system needs an appropriate design of reference signals to ensure proper estimation of MIMO channel coefficients. This is also valid for New Radio where either reference signals use different subcarriers (CDM groups) per data stream, or if same subcarriers are used orthogonal codes are applied to the reference signals of different data streams. Since this essential property does not apply for data symbols, the channel estimation can be based only on reference signals (DMRS) without including any data symbols.

Thus, one or all reference symbols of one time slot can be considered, but in order to obtain comparable EVM results independent of number of reference symbols per time slot, only the first reference symbol is used.

The MIMO communication system may relate to a 2×2 communication system such that an effective channel matrix is provided that is a 2×2 matrix.

In case that same subcarriers are used, a channel decomposition is necessary taking advantage of the orthogonal codes and assuming identical channel coefficients for adjacent subcarriers of same CDM group.

The effective channel including the precoding matrix P can be defined as follows:

$$\tilde{H} = HP = \begin{bmatrix} \tilde{h}_{0,0} & \tilde{h}_{0,1} \\ \tilde{h}_{1,0} & \tilde{h}_{1,1} \end{bmatrix}$$

with $$\tilde{h}_{n,v} = \frac{y_n r_v^*}{|r_v|^2}$$

where y denotes the received symbol on port index n and r the reference signal for data stream index v.

Since reference signals of a specific data stream are transmitted only on subcarriers of one CDM group, a channel interpolation is done in order to obtain channel coefficients for all subcarriers. The channel interpolation is done by using the channel coefficients of the active CDM group in all other CDM groups.

The channel coefficients used to calculate the equalizer coefficients are obtained after a channel smoothing in frequency domain by computing the moving average of interpolated channel coefficients. However, the channel smoothing may also be done afterwards. Irrespective thereof, the moving average window size is seven due to the fourteen symbols within one time slot. For subcarriers at or near the edge of allocation the window size can be reduced accordingly.

The equalizer coefficients, e.g. zero forcing equalizer coefficients, are calculated as a pseudo inverse of the effective channel, namely as follows:

$$G_{ZF} = \tilde{H}^+ = (\tilde{H}^H \tilde{H})^{-1} \tilde{H}^H$$

After the data stream separation, the single layer procedure is applied, namely the procedure applicable for a single data stream, which has been discussed before in more detail.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
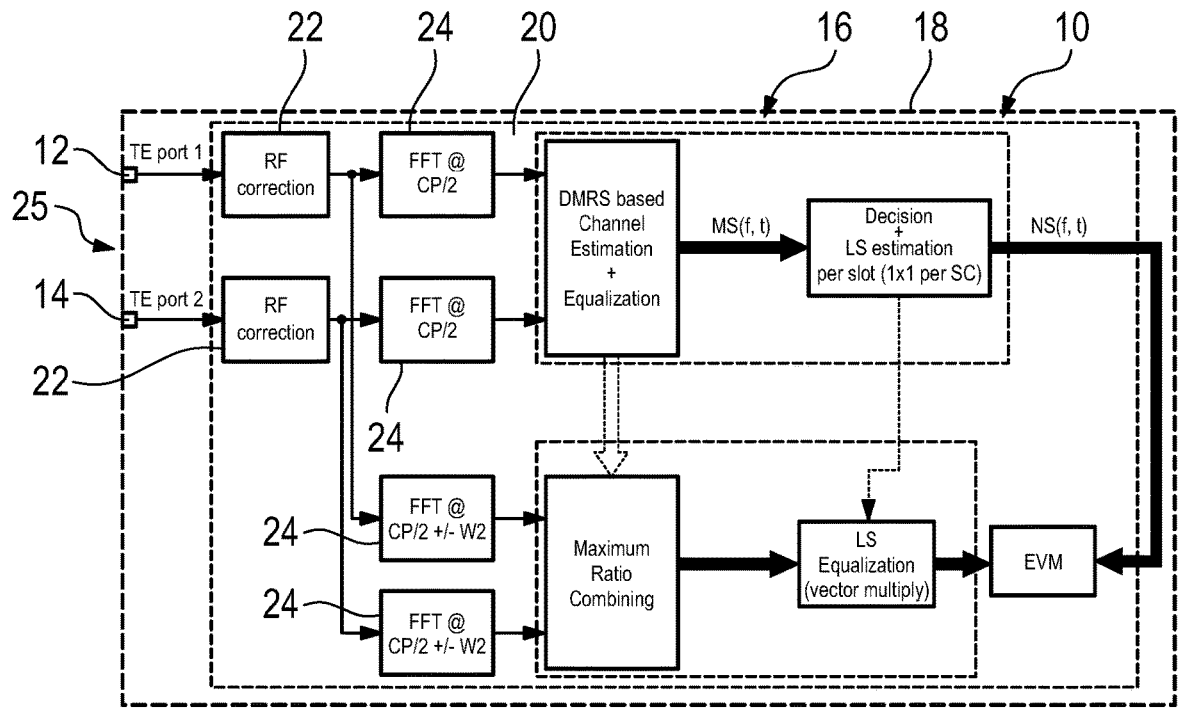
FIG. 1 schematically shows an overview of a signal processing system according to a first embodiment, and FIG. 2 schematically shows an overview of a signal processing system according to a second embodiment.

In FIG. 1, a signal processing system 10 for channel estimation is shown that comprises, for example, two input ports 12, 14 that are labelled by TE port 1 and TE port 2, respectively. In some embodiments, the entire signal processing system 10 may be integrated in a test equipment 16 that has a housing 18 which encompasses the respective components and circuitry of the signal processing system 10. The signal processing system 10 also comprises a processing circuit 20 that is connected with the input ports 12, 14 in order to receive the input signals received via the input ports 12, 14 for processing purposes. The processing circuit 20 may include one or more circuits, sub-circuits, etc., to carry out its functionality described herein.

Hence, the input ports 12, 14 are configured to receive an input signal that may be associated with a single independent data stream, which has reference symbols and data symbols. Thus, the embodiment shown in FIG. 1 relates to a single data stream processing with receiving diversity due to the two different input ports 12, 14 receiving input signals that correspond to a common single data stream.

As shown in FIG. 1, the processing circuit 20 comprises radio frequency correction circuits 22 that are used to calculate carrier frequency error and carrier leakage. Further, the processing circuit 20 comprises fast Fourier transform circuits 24 that are used to process the input signals received via the input ports 12, 14 respectively.

Prior to processing the input signal by the fast Fourier transform circuits 24, the input signals may be portioned into pieces that each comprise a time slot such that the input signals are processed in a slot-wise manner, for example separately. The processing of the input signals in the slot-wise manner comprises a pre FFT minimization process as well as timing of the FFT window.

For instance, the FFT window length is 2048 samples per symbol, for example Orthogonal Frequency-Division Multiplexing (OFDM) symbol. Within one time slot, fourteen symbols are provided such that 28762 samples are obtained per time slot, which may be less than the number of acquired samples such that the position in time has to be determined.

In an ideal signal, the FFT may start at any instant within the cyclic prefix (CP) without causing an error. The transmission filter, however, reduces the window. The EVM requirements shall be met within a window W<CP. Accordingly, there are three different instants for FFT, namely the center of the reduced window, called CP/2, CP/2−W/2 and CP/2+W/2 as indicated in FIG. 1.

In general, the test equipment 16 may receive the input signals from the two different ports 12, 14 as shown in FIG. 1, which are connected to antenna ports of the user equipment to be tested, namely the device under test.

In the embodiment shown, a communication system 25 with receiving diversity is provided since two different input signals are received that correspond to the same data stream.

On transmitter side, namely the side of the user equipment, a transmission diversity could be enabled or disabled, which however has no influence on the methods as described herein after.

Accordingly, the processing circuit 20 is configured to perform an additional step for combining the signals received from both ports 12, 14 in comparison to a single layer transmission without receiving diversity. This may be done by a maximum-ratio combining (MRC) which is a method of diversity combining in which inter alia the signals from each channel are added together, thereby obtaining a combined signal for further processing.

Afterwards, the combined signal is processed using a single layer procedure without receiving diversity such that the error vector magnitude (EVM) calculation can be done for a single time slot that comprises up to 14 orthogonal frequency-division multiplexing (OFDM) symbols that include reference symbols and data symbols.

The respective step for combining the input signals received is based on a two-step approach.

In some embodiments, the channel estimation for maximum ratio combining is based only on reference signals, e.g. demodulation reference signals (DMRS), without including any data symbols. In some embodiments, only one reference symbol per time slot is considered, for instance the first reference symbol, such that comparable error vector magnitude results are obtained which are independent of the number of reference symbols per time slot.

The channel estimation based on the reference symbols is done in a first step of the two-step approach, wherein an effective 2×1 channel is estimated.

The reference signals and the respective reference symbols are typically transmitted only on subcarriers of one code division-multiplex group such that a channel interpolation is required in order to obtain the channel coefficients for all subcarriers. The channel interpolation required is done by using the channel coefficients of the active code division-multiplex (CDM) group in all other code division-multiplex (CDM) groups.

The respective channel coefficients used to calculate the equalizer coefficients may be obtained after the channel smoothing in frequency domain by computing a moving average of interpolated channel coefficients. The moving average window size is seven due to 14 OFDM symbols provided in a single time slot. The window size can be reduced accordingly for subcarriers at or near the edge of allocation.

Afterwards, a combined signal is obtained that can be processed by a single layer procedure, namely single data stream procedure.

In some embodiments, a least squares method is applied on the combined signal for performing an additional channel estimation. In other words, the outcome of the channel estimation, namely a processed signal, is further processed while performing the additional channel estimation. During the additional channel estimation, the reference symbols and the data symbols are taken into account.

Since the channel estimation for maximum ratio combing was calculated only on the first reference symbol, an averaging including all 14 symbols of a single time slot is suitable in order to minimize the error vector magnitude. This averaging is achieved by the least squares equalization method that can be used for a single data stream equalization accordingly. In some embodiments, measured data symbol and nominal data symbols are processed by the least squares estimator in order to derive one equalizer coefficient per time slot and per allocated subcarrier.

The equalizer coefficients used for maximum ratio combining can be calculated as pseudoinverse of the effective channel.

Different to single data stream without receiving diversity, the equalizer coefficients are not used to calculate error vector magnitude equalizer spectral flatness, which is derived from the equalizer for maximum ratio combining.

Accordingly, a channel estimation has been performed by taking at least one reference symbol per input signal into account, which is used to equalize the respective input signal and to assign the symbols to the at least one data stream, thereby generating a processed signal for each independent data stream.

In a further processing, the processed signal is used for performing an additional channel estimation for each independent data stream, wherein the reference symbols and the data symbols are taken in account for the additional channel estimation. However, the additional channel estimation is independent of the reconstructed data symbols, namely the transmitted data symbols, as it is based on the processed signal obtained from the channel estimation as well as the reference symbols and the data symbols received.

Figure 2:
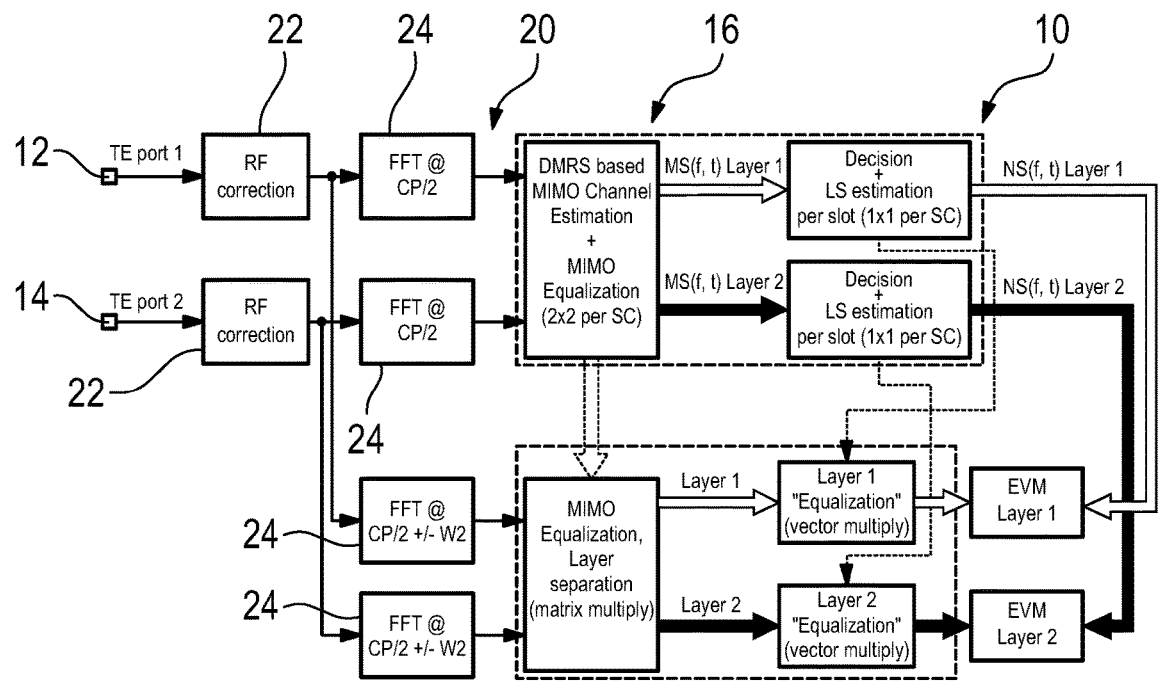

In FIG. 2, another embodiment of the signal processing system 10 is shown, that is used for performing a method of error vector magnitude calculation for an uplink multiple input and multiple output (MIMO) communication system with multi-layer transmission, namely multi data stream transmission. In the shown embodiment, the calculation on the error vector magnitude is described by using two different data streams and two receiving ports 12, 14 of the test equipment 16. However, the same procedure can be applied for transmission with four independent data streams received on four test equipment ports.

Compared to a single layer transmission, an additional step for multiple input and multiple output (MIMO) equalization is introduced to separate the two independent data streams. Once the two independent data streams are separated from each other, each data stream is processed by a single layer procedure described above.

As described previously with respect to the embodiment shown in FIG. 1, the channel estimation is based only on reference signals (DMRS) without including any data symbols. In some embodiments, the first reference symbol may be used for channel estimation, wherein an effective 2×2 channel matrix is used for describing the effective channel.

Since the reference signals of the specific data stream are transmitted only on subcarriers of one code division-multiplex (CDM) group, a channel interpolation is needed in order to obtain channel coefficients for all subcarriers.

The channel interpolation is done by using the channel coefficients of the active code division-multiplex group in all other code division-multiplex groups. The channel coefficients obtained are used to calculate the equalizer coefficients, wherein the channel coefficients may be obtained after a channel smoothing in the frequency domain by computing the moving average of interpolated channel coefficients as discussed above with respect to the embodiment shown in FIG. 1.

Hence, each data stream can be separated such that each data stream is processed by using the single layer procedure described above in an individual manner.

In other words, a data stream separation is performed, thereby obtaining measured reference symbols and data symbols MS(f,t) for each data stream separately, which are processed individually in order to perform a least square estimation per subcarrier. The data stream separation is done by a multiple input multiple output (MIMO) equalization technique.

The separated data streams are processed according to the single data stream procedure, thereby obtaining the nominal data symbols NS(f,t) for each data stream individually. These nominal data symbols NS(f,t) for each data stream are used together with the equalized data symbols obtained for each data stream individually in order to calculate the respective error vector magnitude (EVM) for each data stream individually.

As shown in the FIGURES, the data streams are separated such that the channel estimation(s), namely the one according to the first step and/or the one according to the second step of the two-step approach, and/or the equalization are/is done for each data stream individually and independently of other data streams.

Accordingly, a method and a signal processing system are described that can be used for calculating the error vector magnitude for a single layer communication as well as a multiple layer communication wherein the respective method is based on the reference symbols while being independent of the transmitted data symbols, namely the reconstructed ones.

In some embodiments, the methods set forth herein can be carried out in a computer system or processing (e.g., processor circuit) environment. In this regard, embodiments of the processor circuit are provided, which are specifically programmed or configured to carry out of methods of channel estimation in a communication system. In an embodiment, the processor circuit is a specifically configured machine that is configured to: receive at least one input signal associated with at least one data stream, the input signal having reference symbols and data symbols, process the at least one input signal in a slot-wise manner, perform a channel estimation by taking at least one reference symbol per input signal into account, which is used to equalize the respective input signal and to assign the symbols to the at least one data stream, thereby generating a processed signal for each independent data stream, and process further the processed signal while performing an additional channel estimation for each independent data stream, wherein the reference symbols and the data symbols are taken into account for the additional channel estimation. The specifically configured machine is also configured to perform the steps of claims set forth below.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

Various embodiments of the present disclosure or the functionality thereof may be implemented in various ways, including as non-transitory computer program products. A computer program product may include a non-transitory computer-readable medium, such as non-transitory computer-readable storage medium, storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of channel estimation in a communication system, the method comprising the steps of:
   receiving at least one input signal associated with at least one data stream, the input signal having reference symbols and data symbols,
   processing the at least one input signal in a slot-wise manner,
   performing a channel estimation by taking at least one reference symbol per input signal into account, which is used to equalize the respective input signal such that all symbols associated with the input signal are equalized and assigned to the at least one data stream, thereby generating a processed signal for each independent data stream, and
   processing further the processed signal in order to perform an additional channel estimation for each independent data stream, wherein the reference symbols and the data symbols are taken into account for the additional channel estimation.

2. The method according to claim 1, wherein the channel estimation and/or the additional channel estimation are/is performed without using reconstructed data symbols and/or demodulated data symbols.

3. The method according to claim 1, wherein the channel estimation is performed by only taking the at least one reference symbol per input signal into account.

4. The method according to claim 1, wherein at least two input signals are received that correspond to a single data stream.

5. The method according to claim 1, wherein at least two input signals are received that correspond to two independent data streams.

6. The method according to claim 1, wherein the number of input signals is higher or equal the number of independent data streams.

7. The method according to claim 1, wherein a least squares method is used when performing the channel estimation and/or the additional channel estimation.

8. The method according to claim 1, wherein a channel equalization is performed based on the additional channel estimation.

9. The method according to claim 8, wherein the channel equalization is done by means of a zero forcing equalizer.

10. The method according to claim 1, wherein equalization coefficients are determined.

11. The method according to claim 10, wherein the equalization coefficients determined are used for equalizing at different points in time.

12. The method according to claim 1, wherein the channel estimation is performed for a subset of Orthogonal Frequency-Division Multiplexing (OFDM) subcarriers, and wherein an interpolation is performed.

13. The method according to claim 1, wherein the channel estimation is performed for several Orthogonal Frequency-Division Multiplexing (OFDM) subcarriers, and wherein the channel estimation comprises a smoothing step.

14. The method according to claim 1, wherein an error vector magnitude is calculated.

15. A signal processing system for channel estimation, wherein the signal processing system comprises:
- at least one input port and a processing circuit connected with the input port,
- wherein the at least one input port is configured to receive at least one input signal associated with at least one data stream, the input signal having reference symbols and data symbols,
- wherein the processing circuit is configured to:
- process the input signal received via the input port in a slot-wise manner;
- perform a channel estimation by taking at least one reference symbol per input signal into account, which is used to equalize the respective input signal such that all symbols associated with the input signal are equalized and assigned to the at least one data stream, thereby generating a processed signal for each independent data stream; and
- process further the processed signal in order to perform an additional channel estimation for each independent data stream, wherein the reference symbols and the data symbols are taken into account for the additional channel estimation.

16. A method of channel estimation in a communication system, the method comprising the steps of:
- receiving at least one input signal associated with at least one data stream, the input signal having reference symbols and data symbols, wherein all symbols are assigned to the at least one data stream,
- processing the at least one input signal in a slot-wise manner,
- performing a channel estimation by taking at least one reference symbol per input signal into account, which is used to equalize the respective input signal and to assign the symbols to the at least one data stream such that all symbols associated with the input signal are equalized, thereby generating a processed signal for each independent data stream, and
- processing further the processed signal, thereby performing an additional channel estimation for each independent data stream, wherein the reference symbols and the data symbols are taken into account for the additional channel estimation.

* * * * *